United States Patent Office 3,115,513
Patented Dec. 24, 1963

3,115,513
N-(α-HYDROXYALKYL)IMIDO ESTERS AND THEIR PREPARATION
Francis Wilfred Stacey, Wilmington, Del., assignor to E. I. du Pont de Nemours and Company, Wilmington, Del., a corporation of Delaware
No Drawing. Filed Mar. 29, 1962, Ser. No. 183,407
9 Claims. (Cl. 260—453)

This invention relates to a new class of nitrogen-containing organic compounds. More particularly, it relates to a new class of N-(substituted)imido esters and to a method for their preparation.

The novel products of this invention are N-(α-hydroxyalkyl)imido esters of the formula:

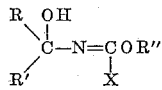

wherein R is hydrogen, haloalkyl of up to 10 carbons (particularly a haloalkyl group wherein all halogens are of atomic number 9–17) or carboalkoxy of up to 10 carbons, R' is R or alkyl of up to 10 carbons, R" is lower alkyl (1 through 7 carbons), and X is lower alkyl, lower alkoxy (1 through 7 carbons) or —CN, with the proviso that at most one of R and R' is hydrogen. Most preferred are the products thus defined in which at least one of R and R' is haloalkyl.

The novel compounds of this invention are prepared simply by admixing a carbonyl compound of the formula:

with an imido ester of the formula:

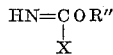

wherein R, R', R" and X have the meanings defined above, at reaction temperature.

The reaction temperature is not critical but will vary depending on the stability of the particular reactants and products involved. Usually, reaction between the carbonyl compound and the imido ester takes place at temperatures ranging from about 0° C. up to the decomposition point of the product that is formed, e.g., up to about 100° C. When carbonyl compounds that readily form hydrates are used as reactants, reaction with the imido ester takes place exothermally simply on mixing the reactants together. In such cases, it is desirable to cool the reaction mixture by external means to maintain the reaction mixture below about 50° C. With the less reactive carbonyl compounds, reaction takes place on heating the carbonyl compound with the imido ester at a temperature of about 50–100° C. Preferably, the reaction is carried out at a temperature between 25 and 75° C.

The reaction takes place in accordance with the following general equation wherein the various symbols have the meanings defined above:

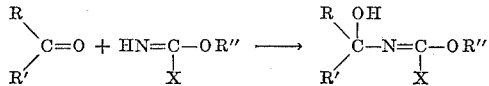

From this equation, it is evident that one mole of the carbonyl compound reacts with one mole of the unsubstituted imido ester; therefore, approximately equimolar amounts of the reactants are preferably employed. However, the proportions of the reactants employed are not critical as an excess of either can be used. Generally, the proportions of reactants will lie between 3:1 and 1:3.

The time required for reaction to take place varies widely depending on the particular reactants and reaction temperatures employed. The reaction time can vary from a few minutes, e.g., 10–30 minutes, for the most reactive compounds up to several days, e.g., 1–3 days, for the less reactive compounds.

Reaction takes place readily at atmospheric pressure; therefore, it is most convenient to conduct the reaction at this pressure. However, superatmospheric or subatmospheric pressures can be employed if desired. Similarly, the reaction between the carbonyl compound and the unsubstituted imido ester takes place in the absence of a solvent. However, any organic solvent that is inert to the reactants and the reaction products under the reaction conditions can be used if desired. The use of a solvent is preferred, especially when the reaction is exothermic. Specific inert solvents that can be used as reaction media include tetrahydrofuran, diethyl ether and acetonitrile.

The products of this invention and the method for their preparation are illustrated in further detail by the following examples wherein the proportions of ingredients are expressed in parts by weight unless otherwise specified, and the reactions are carried out at atmospheric pressure.

EXAMPLE I

*Reaction of Trichloroacetaldehyde With Dimethyl Imidocarbonate*

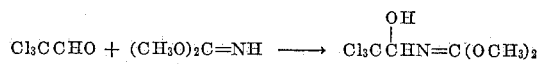

Seven parts of trichloroacetaldehyde (0.05 mole) is added dropwise to 9 parts of dimethyl imidocarbonate (0.1 mole) which is stirred, and cooled by means of an ice bath. The rate of addition is adjusted so as to maintain the reaction mixture at a temperature of 34–45° C., about 20 minutes being required for the addition of the aldehyde. Distillation of the reaction mixture gives 5 parts (42% yield) of dimethyl N-(β,β,β-trichloro-α-hydroxyethyl)imidocarbonate boiling at 54–60° C./4 mm. The product crystallizes on standing. After recrystallization from a mixture of pentane and ether, the product has a melting point of 69.5°–70.5° C.

*Analysis.*—Calc'd for $C_5H_8Cl_3NO_3$: Cl, 44.98%; N, 5.93%. Found: Cl, 44.95%; N, 5.74%.

The infrared absorption spectrum shows bands at 3.0 microns (—OH) and at 6.1 microns (=C=N—).

EXAMPLE II

*Reaction of ω-Hydrooctafluorovaleraldehyde With Dimethyl Imidocarbonate*

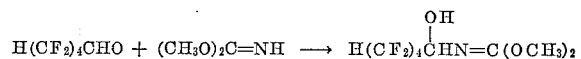

Seven parts (0.03 mole) of ω-hydrooctafluorovaleraldehyde is added dropwise to 6 parts (0.06 mole) of dimethyl imidocarbonate with stirring and with the reaction mixture cooled externally by means of an ice-water bath. The rate of addition is adjusted so as to maintain the temperature of the reaction mixture at 40–45° C., about 15 minutes being required for the addition of the aldehyde. Distillation of the reaction mixture through a short path column gives 7.2 parts (75% yield) of dimethyl N-(α-hydroxy-α,ω-dihydrooctafluoropentyl)imidocarbonate, boiling at 55–66° C./1 mm.

*Analysis.*—Calc'd for $C_8H_9F_8O_3N$: F, 47.65%; N, 4.39%. Found: F, 48.16%; N, 4.38%.

The infrared absorption spectrum shows bands at 2.9 microns (—OH), 5.9–6.1 microns (=C=N—), 3.3 microns (C—H), and at 7.5–9.0 microns (C—F).

EXAMPLE III

*Reaction of Dichlorotetrafluoroacetone With Ethyl Cyanoimidoformate*

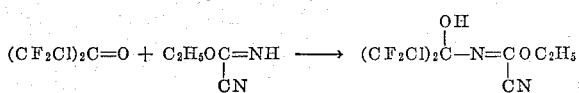

Seven parts (0.07 mole) of ethyl cyanoimidoformate is added dropwise to 16 parts (0.08 mole) of dichlorotetrafluoroacetone with stirring and with the reaction vessel cooled in ice water. The addition requires 0.75 hour and after addition is complete, the mixture is allowed to stand at room temperature (approximately 25° C.) for 2 hours. Distillation through a short path column gives 16.5 parts (79% yield) of ethyl N-(1,3-dichloro-1,1,3,3-tetrafluoro-2-hydroxy-2-propyl)cyanoimidoformate, boiling at 72–79° C./0.4–0.5 mm. and having a refractive index, $n_D^{25}$, of 1.4297.

*Analysis.*—Calc'd for $C_7H_6Cl_2F_4N_2O_2$: F, 24.79%; N, 9.74%; M.W., 307. Found: F, 25.49%; N, 9.43%; M.W., 302.

The infrared spectrum shows absorption bands at 3.0 microns (—OH), 4.3–4.4 microns (—C≡N), 5.7–6.0 microns (a doublet, =C=N—) and at 7.5–9.0 microns (C—F).

EXAMPLE IV

*Reaction of Butyraldehyde With Dimethyl Imidocarbonate*

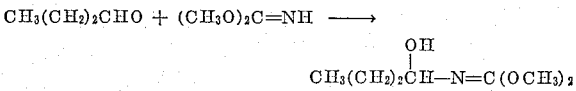

A mixture of 20 parts (0.28 mole) of n-butyraldehyde and 8.6 parts (0.097 mole) of dimethyl imidocarbonate is allowed to stand at room temperature for 24 hours. Distillation of the reaction mixture gives 4.8 parts (31% yield) of a 1:1 adduct, boiling at 80–100° C./1 mm., which is dimethyl N-(α-hydroxybutyl)imidocarbonate.

*Analysis.*—Calc'd for $C_6H_{15}NO_3$: N, 8.69%. Found: N, 8.41%.

EXAMPLE V

*Reaction of Dichlorotetrafluoroacetone With Dimethyl Imidocarbonate*

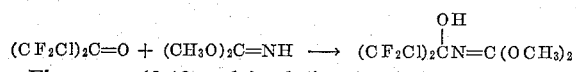

Five parts (0.10 mole) of dimethyl imidocarbonate is added dropwise to 20 parts (0.10 mole) of dichlorotetrafluoroacetone with stirring and cooling. The temperature is maintained at 20–30° C. during the 20 minutes required for the addition. Distillation of the reaction mixture through a Vigreux column gives 24 parts (83% yield) of dimethyl N-(1,3-dichloro-1,1,3,3-tetrafluoro-2-hydroxy-2-propyl)imidocarbonate, boiling at 52–60° C./1.3–1.6 mm. (mostly at 60° C./1.3 mm.); $n_D^{24}$, 1.4140.

*Analysis.*—Calc'd for $C_6H_7F_4Cl_2NO_3$: Cl, 24.62%; F, 26.4%. Found: Cl, 24.11%; F, 25.8%.

EXAMPLE VI

*Reaction of Diethyl Mesoxalate With Ethyl Cyanoimidoformate*

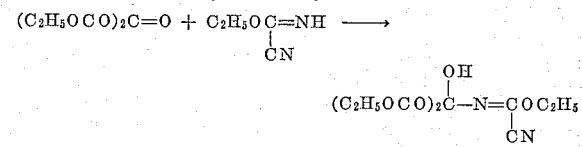

Ethyl cyanoimidoformate (4.9 parts, 0.05 mole) is added dropwise to 9 parts (0.05 mole) of diethyl mesoxalate with stirring. The rate of addition is adjusted to maintain the temperature of the reaction mixture at 35–45° C. After completion of the addition, which requires about 30 minutes, the mixture is allowed to stand at room temperature for about 0.5 hour. Distillation of the reaction mixture through a short path distillation column gives 10 parts (75 % yield) of ethyl N-(α-hydroxydiethylmalonyl)cyanoimidoformate boiling at 120–135° C./0.25 mm.

*Analysis.*—Calc'd for $C_{11}H_{16}N_2O_6$: C, 48.52%; H, 5.92%; N, 10.29%. Found: C, 48.19%; H, 5.88%; N, 10.08%.

The above examples have illustrated the products and process of this invention by reference to the reaction of certain aldehydes and ketones with certain N-(unsubstituted)imido esters. However, this invention includes as new products any N-(α-hydroxyalkyl)imido ester of the formula

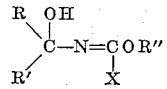

wherein R, R', R" and X have the meanings defined hereinbefore. Additional examples of such products are found in Table I, below. The reactants in the left and center columns of Table I are equivalent to and may be substituted for the reactants employed in the processes of Examples I–VI to yield the products of this invention listed in the right column.

TABLE I.—N-(α-HYDROXYALKYL) IMIDO ESTERS

| Reactants | | Products |
|---|---|---|
| Carbonyl Compound | N-(unsubstituted)-imido Ester | N-(α-Hydroxyalkyl)-imido Ester |
| $CF_3CHO$ | $HN=C-OC_2H_5$<br>$\|$<br>$C_4H_9$ | $OH$<br>$\|$<br>$CF_3CH-N=C-OC_2H_5$<br>$\|$<br>$C_4H_9$ |
| $CF_3CH_2CHO$ | $HN=C-OC_2H_5$<br>$\|$<br>$CN$ | $OH$<br>$\|$<br>$CF_3CH_2CH-N=C-OC_2H_5$<br>$\|$<br>$CN$ |
| $CH_3(CH_2)_7CHO$ | $HN=C-O-CH_3$<br>$\|$<br>$CH_3$ | $OH$<br>$\|$<br>$CH_3(CH_2)_7CH-N=C-OCH_3$<br>$\|$<br>$CH_3$ |
| $H(CF_2)_8CHO$ | $HN=C(OCH_3)_2$ | $OH$<br>$\|$<br>$H(CF_2)_8CH-N=C(OCH_3)_2$ |
| $CH_3(CH_2)_9CHO$ | $HN=C(OCH_3)_2$ | $OH$<br>$\|$<br>$CH_3(CH_2)_9CH-N=C(OCH_3)_2$ |

TABLE I—Continued

| Reactants | | Products |
|---|---|---|
| Carbonyl Compound | N-(unsubstituted)-imido Ester | N-(α-Hydroxyalkyl)-imido Ester |
| $[CF_3(CF_2)_6]_2C=O$ | $HN=C-OC_2H_5$<br>$\quad\quad\;\;\mid$<br>$\quad\quad\;\;C_2H_5$ | $\quad\quad\quad\;\;OH$<br>$[CF_3(CF_2)_6]_2C-N=COC_2H_5$<br>$\quad\quad\quad\quad\quad\;\mid$<br>$\quad\quad\quad\quad\quad\;C_2H_5$ |
| $CF_3CCBr_3$<br>$\;\;\;\parallel$<br>$\;\;\;O$ | $HN=C-O-isoC_4H_9$<br>$\quad\quad\;\;\mid$<br>$\quad\quad\;\;C_2H_5$ | $CF_3\;\;OH$<br>$\;\;\;\;C-N=C-O-isoC_4H_9$<br>$CBr_3\;\;C_2H_5$ |
| $[H(CF_2)_2]_2C=O$ | $HN=C-O-n-C_5H_{11}$<br>$\quad\quad\;\;\mid$<br>$\quad\quad\;\;CH_2CH_2CH_3$ | $\quad\quad\quad\;\;OH$<br>$[H(CF_2)_2]_2C-N=C-O-n-C_5H_{11}$<br>$\quad\quad\quad\quad\;\;\mid$<br>$\quad\quad\quad\quad\;\;CH_2CH_2CH_3$ |
| $CF_3C-n-C_6H_{13}$<br>$\;\;\;\parallel$<br>$\;\;\;O$ | $HN=C-O-CH_2CH_2CH_3$<br>$\quad\quad\;\;\mid$<br>$\quad\quad\;\;CH_3$ | $\quad\quad\;\;OH$<br>$n-C_6H_{13}-C-N=C-O-CH_2CH_2CH_3$<br>$\quad\quad\;\;\;\mid\quad\quad\;\mid$<br>$\quad\quad\;\;CF_3\;\;\;CH_3$ |
| $HCF_2CCF_3$<br>$\;\;\;\parallel$<br>$\;\;\;O$ | $HN=COCH_3$<br>$\quad\;\;\mid$<br>$\quad\;\;CN$ | $HCF_2\;\;OH$<br>$\quad\;\;C-N=COCH_3$<br>$CF_3\;\;\;CN$ |
| $CH_3C-COCH_2CH_2CH(CH_3)_2$<br>$\;\;\;\parallel\;\;\;\parallel$<br>$\;\;\;O\;\;\;O$ | $HN=COC_3H_7$<br>$\quad\;\;\mid$<br>$\quad\;\;CN$ | $\quad\quad\quad\quad\;\;CH_3\;\;OH$<br>$\quad\quad\quad\quad\quad\;C-N=COC_3H_7$<br>$(CH_3)_2CHCH_2CH_2OC\quad\;CN$<br>$\quad\quad\quad\quad\quad\;\parallel$<br>$\quad\quad\quad\quad\quad\;O$ |
| $CCl_3CCCl_3$<br>$\;\;\;\parallel$<br>$\;\;\;O$ | $HN=C(OC_7H_{15})_2$ | $\quad\quad\;\;OH$<br>$(CCl_3)_2C-N=C(OC_7H_{15})_2$ |
| $ClCF_2CF_2C-C-CF_3$<br>$\quad\quad\;\;\parallel\;\;\mid$<br>$\quad\quad\;\;O\;\;CF_3$<br>with F on C | $HN=C-OC_2H_5$<br>$\quad\quad\;\;\mid$<br>$\quad\quad\;\;CN$ | $ClCF_2CF_2\;\;OH$<br>$\quad\quad\;\;C-N=C-OC_2H_5$<br>$\quad\quad\;\;\mid\quad\quad\;\;\mid$<br>$\quad\;\;CF_3\quad\quad\;CN$<br>$\quad\;\;\mid$<br>$\quad\;\;C$<br>$\;\;/\;\backslash$<br>$CF_3\;\;F$ |
| $(CF_3)_2C=O$ | $HN=C-OC_2H_5$<br>$\quad\quad\;\;\mid$<br>$\quad\;\;iso-C_5H_{11}$ | $\quad\quad\quad\;\;OH$<br>$(CF_3)_2C-N=C-OC_2H_5$<br>$\quad\quad\quad\quad\;\;\mid$<br>$\quad\quad\quad\;iso-C_5H_{11}$ |
| $CF_3CC_2H_5$<br>$\;\;\;\parallel$<br>$\;\;\;O$ | $HN=C(OC_2H_5)_2$ | $CF_3\;\;OH$<br>$\quad\;\;C-N=C(OC_2H_5)_2$<br>$C_2H_5$ |
| $(iso-C_4F_9)_2C=O$ | $HN=COCH_3$<br>$\quad\;\;\mid$<br>$\quad\;\;CH_3$ | $\quad\quad\quad\;\;OH$<br>$(iso-C_4F_9)_2C-N=COCH_3$<br>$\quad\quad\quad\quad\quad\;\mid$<br>$\quad\quad\quad\quad\quad\;CH_3$ |
| $CF_2ClCCFCl_2$<br>$\;\;\;\parallel$<br>$\;\;\;O$ | $HN=COC_2H_5$<br>$\quad\;\;\mid$<br>$\quad\;\;CN$ | $CF_2Cl\;\;OH$<br>$\quad\quad\;\;C-N=COC_2N_5$<br>$CFCl_2\quad\;\;CN$ |
| $CF_3CCCl_3$<br>$\;\;\;\parallel$<br>$\;\;\;O$ | $HN=C(OC_2H_5)_2$ | $CF_3\;\;OH$<br>$\quad\;\;C-N=C(OC_2H_5)_2$<br>$CCl_3$ |
| $CH_3C-COCH_2CH_2CH(C_3H_7)_2$<br>$\;\;\;\parallel\;\;\;\parallel$<br>$\;\;\;O\;\;\;O$ | $HN=C(OC_2H_5)_2$ | $\quad\quad\quad\quad\;\;CH_3\;\;OH$<br>$\quad\quad\quad\quad\quad\;C-N=C(OC_2H_5)_2$<br>$(C_3H_7)_2CHCH_2CH_2OC$<br>$\quad\quad\quad\quad\quad\;\parallel$<br>$\quad\quad\quad\quad\quad\;O$ |
| $CH_2ICCH_2I$<br>$\;\;\;\parallel$<br>$\;\;\;O$ | $HN=COCH_3$<br>$\quad\;\;\mid$<br>$\quad\;\;CH_3$ | $CH_2I\;\;OH$<br>$\quad\;\;C-N=COCH_3$<br>$CH_2I\;\;\;CH_3$ |
| $CF_3CCH_3$<br>$\;\;\;\parallel$<br>$\;\;\;O$ | $HN=COCH_3$<br>$\quad\;\;\mid$<br>$\quad\;\;CH_3$ | $CF_3\;\;OH$<br>$\quad\;\;C-N=COCH_3$<br>$CH_3\;\;\;CH_3$ |

The aldehydes and ketones and N-(unsubstituted)-imido esters used in the process of this invention are either known compounds or can readily be made by known methods, e.g., by the methods for preparing carbonyl compounds described in "Aliphatic Fluorine Compounds," by Lovelace, Rausch, and Postelnek, Reinhold Publishing Corp., New York, 1958, and by the methods for preparing imido esters described in Pinner's "Die Imidoäther und ihre Derivate," Oppenheim, Berlin, 1892, respectively.

The products of this invention are useful as solvents for various polymers. For example, the N-(α-hydroxyalkyl)-imido esters having polyhaloalkyl substituents are solvents for polymers of haloolefins. More particularly, ethyl N-(1,3 - dichloro - 1,1,3,3 - tetrafluoro-2-hydroxy-2-propyl)cyanoimidoformate is a solvent for low molecular weight polytetrafluoroethylene, and can be used as the high boiling component of coating compositions for application of the polytetrafluoroethylene to various substrates, e.g., wood, metal, fabrics, etc.

The N-(α-hydroxyalkyl)imido esters are also useful as herbicides. For example, dimethyl N-(β,β,β-trichloro-α-hydroxyethyl)imidocarbonate applied to soil at a rate of 16 lbs./acre as a pre-emergence herbicide completely kills crab grass and sorghum seedlings, and kills 70% and 60%, respectively, of wild oats and black valentine beans when applied at the same rate as a pre-emergence herbicide. Dimethyl N-(α-hydroxy-α,ω-dihydrooctafluoropentyl)imidocarbonate and N-(1,3-dichloro-1,1,3,3-tetrafluoro-2-hydroxy-2-propyl)cyanoimidoformate also show pre-emergence herbicidal activity towards black valentine beans when applied to soil at a rate of 16 lbs./acre.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

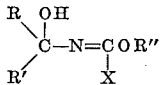

wherein R is a member of the group consisting of hydrogen, haloalkyl of up to 10 carbons, and carboalkoxy of up to 10 carbons; R' is a member of the group consisting of R and alkyl of up to 10 carbons, at most one of R and R' being hydrogen; R" is lower alkyl; and X is a member of the group consisting of lower alkyl, lower alkoxy, and —CN.

2. Dimethyl N - (β,β,β - trichloro - α - hydroxyethyl)-imidocarbonate.
3. Dimethyl N - (α - hydroxy - α,ω - dihydrooctafluoropentyl)imidocarbonate.
4. Ethyl N - (1,3 - dichloro - 1,1,3,3 - tetrafluoro - 2-hydroxy-2-propyl)cyanoimidoformate.
5. Dimethyl N-(α-hydroxybutyl)imidocarbonate.
6. Dimethyl N - (1,3 - dichloro - 1,1,3,3 - tetrafluoro-2-hydroxy-2-propyl)imidocarbonate.
7. Ethyl N - (α - hydroxydiethylmalonyl)cyanoimidoformate.
8. A process which comprises contacting, at a temperature of from about 0° C. up to the decomposition temperature of the product, a carbonyl compound of the formula:

with an imido ester of the formula:

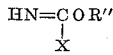

wherein R is a member of the group consisting of hydrogen, haloalkyl of up to 10 carbons, and carboalkoxy of up to 10 carbons; R' is a member of the group consisting of R and alkyl of up to 10 carbons, at most one of R and R' being hydrogen; R" is lower alkyl; and X is a member of the group consisting of lower alkyl, lower alkoxy, and —CN.

9. The process of claim 8 wherein the reaction temperature is in the range of about 0°–100° C.

References Cited in the file of this patent
UNITED STATES PATENTS
1,889,323    Schmidt et al. _____ Nov. 29, 1932